United States Patent Office 3,470,418
Patented Sept. 30, 1969

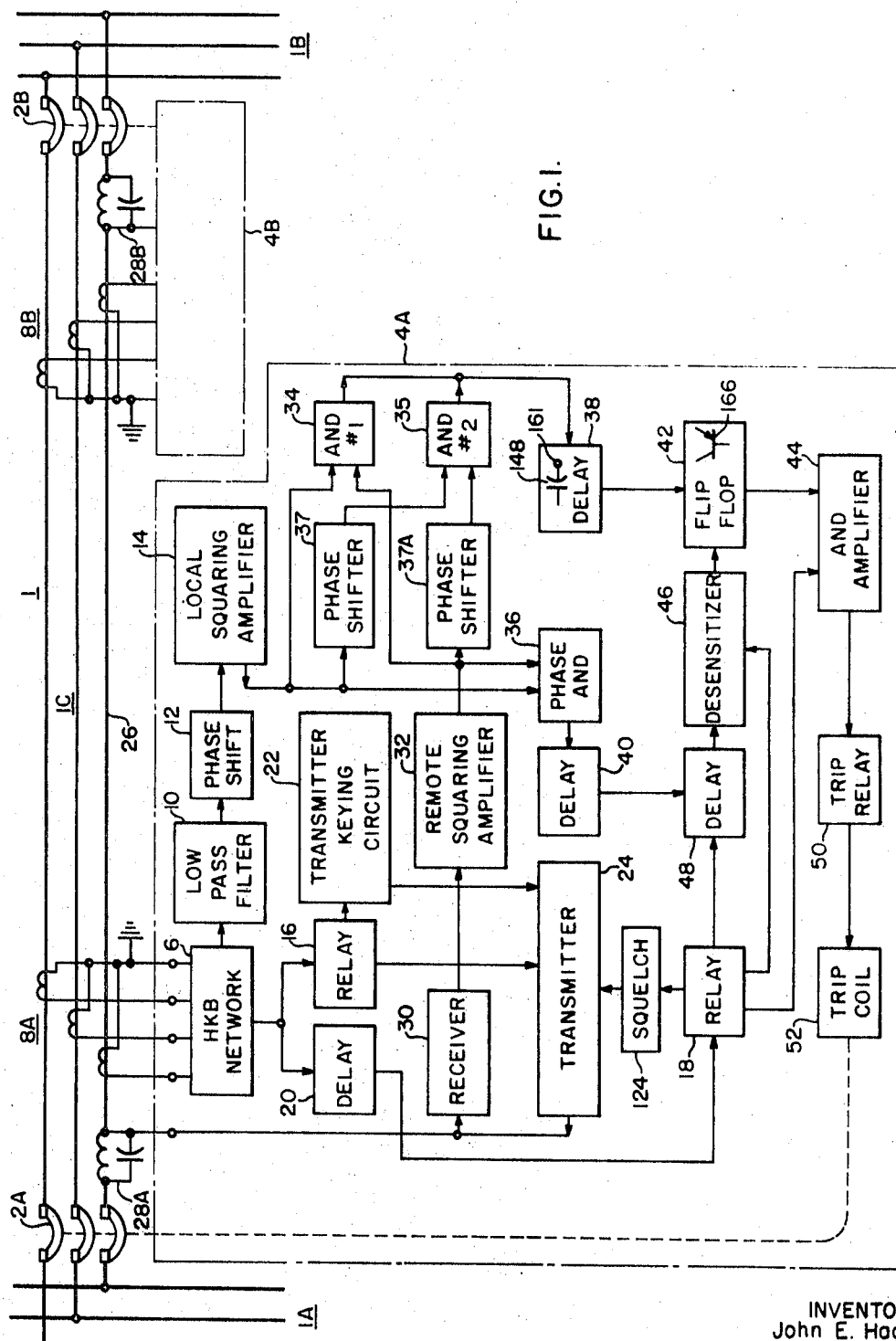

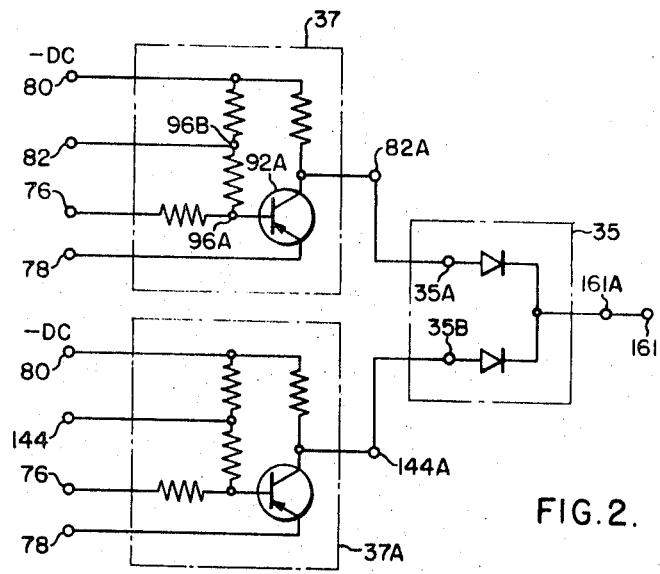
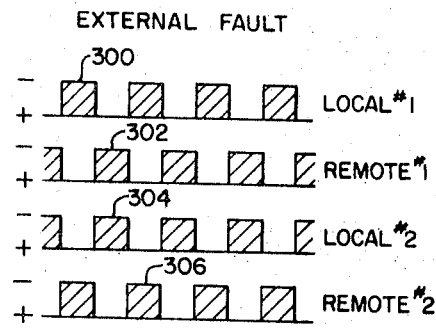
FIG.3.
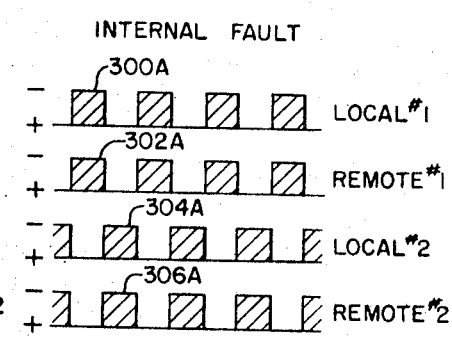
FIG.4.

3,470,418
PHASE COMPARISON RELAYING NETWORK
John E. Hagberg, Mountain Lakes, and Herbert W. Lensner, East Orange, N.J., assignors to Westinghouse Electric Corporation, Pittsburgh, Pa., a corporation of Pennsylvania
Filed June 6, 1967, Ser. No. 643,995
Int. Cl. H02h 3/28, 7/26
U.S. Cl. 317—27                               10 Claims

ABSTRACT OF THE DISCLOSURE

This disclosure discloses a phase comparison relaying system which will provide a trip signal to a circuit breaker in the case of an internal fault within the line section being protected with a time delay which is substantially the same irrespective of the time in any half-cycle during which the internal fault occurs. This is accomplished by the use of two AND circuits both of which are fed from the same pair of squaring amplifiers. One amplifier is actuated by the local and the other by the remote terminal. The amplifier signals are dependent upon the direction of current flow. The inputs of one of the AND circuits are connected through phasing networks which are set to reverse the phase of the local and remote squaring amplifier by 180°. These phasing networks, for example, may be NOT circuits so that one of the AND circuits will be actuated during one half-cycle of the flow of power and the other AND during the other half-cycle flow of power. The outputs of both AND circuits are connected through a common delay unit to the trip coil of the relay which operates the circuit breaker.

---

This invention is an improvement over the relaying device disclosed and claimed in U.S. Patent No. 3,295,019 to C. T. Altfather dated Dec. 27, 1966 for Phase Comparison Relaying Device. In the Altfather patent, the fault condition is sensed during every other half-cycle. Therefore, if the fault occurs so near the end of the sensing half-cycle that the sensing half-cycle ends the delay network times out, the delay unit will not time out and actuate the trip coil for the breaker but will reset and wait to time out during the next sensing half-cycle. For example; if the delay interval of the delay network is set for 4 milliseconds and the fault occurs 3 milliseconds before the end of the sensing half-cycle, the delay unit will have sufficient time to time out before the end of the sensing half-cycle and will reset during the next non-sensing half-cycle and must time out in the following sensing half-cycle. On a 60 cycle per second network the time to actuate the trip coil will be a time of 3 milliseconds plus 8 milliseconds plus 4 milliseconds or a total time of substantially 15 milliseconds before the trip coil is actuated to trip the breaker. With the circuitry of invention, the delay interval before the trip coil will be actuated to operate the breaker upon he occurrence of an internal fault will always be substantially that of the delay network which desirably is 4 milliseconds.

It is an object of this invention to provide a fast operating phase comparison type relaying network.

A further object is to provide a relaying network which will always have a substantially fixed time delay irrespective of the point in the current wave at which the internal fault occurs.

Other objects of this invention will be apparent from the description, the appended claims and the drawings in which:

FIGURE 1 illustrates diagrammatically a phase comparison relaying system embodying the invention;

FIG. 2 illustrates a type of phase shifter which may be utilized in the embodiment of FIG. 1, and FIGS. 3 and 4 are schematic illustrations of the signals which are applied to the AND network for external and internal faults, respectively.

The reference characters used in FIG. 1 and as far as possible in FIG. 2, correspond to the reference characters used in the above-identified Altfather Patent 3,295,019. This patent shows and describes typical circuits, in schematic form, which may be embodied in the boxes identified by name and by reference characters. The numeral 1 designates generally a three-phase power network comprising a first section 1A, which may be suitably energized from a cource of electrical energy, a second section 1B which may be suitably energized from another source of electrical energy, and a protected section 1C which is connected.

The network 6 may take any desired form which proportions of 1A and 1B respectively.

The breakers 2A and 2B are controlled by relaying devices 4A and 4B which sense the presence of the fault in the distributing network or system 1. Each of the relaying devices 4A and 4B include a network 6 which is energized as a function of the fault quantity at the ends of the line section 1C. Since both of the relaying devices 4A and 4B are identical, only the block make up of the device 4A is shown. It is to be understood, however, that the other device 4B is constructed similarly.

The network 6 may take any desired form which provides a single-phase alternating potential output signal representative of the magnitude and directions of the fault quantity, for example current, at the location on the systems at which the network 6 is connected. Such a network 6, identified in applicant's drawing as an HKB network, could take the form of the HCB network shown and described in Lensner Patent No. 2,406,615.

The network 6 is energized from the system 1 from the transformer array 8A and provides an alternating potential output signal (as for example that taken between the terminals 19 and 20 of said Lensner patent). This signal is supplied through a low pass filter 10 and phase shifting network 12 to actuate a local squaring amplifier 14 which squares and amplifies the signal applied thereto. The phase of this output signal is dependent upon the direction of flow of the fault quantity at the location of the transformer array to which it is connected.

As illustrated in said Lensner patent the HKB network 6 may have a unidirection potential signal component supplied by the rectifier network 23 of the said Lensner patent. This latter unidirectional signal component is supplied to a pair of relays 16 and 18; the relay 18 being supplied through a delay network 20 so that the relay 16 will always operate at least a predetermined time interval prior to operation of the relay 18. In many instances it is desirable to adjust the relay 18 so that it will operate at a somewhat higher output voltage of the HKB network than is required for operation of the relay 16.

When the relay 16 operates, it places the transmitter 24 under control of the transmitter keying circuit 22 which causes the transmitter to provide an on and off carrier singal at the frequency of the system 1. The transmitter 24 supplies the relaying device 4B with intelligence concerning the direction of flow of the fault quantity at the relaying device 4A. As illustrated, the output or carrier signal of the transmitter 24 is applied to one conductor 26 of the line section 1C. The signal could of course be transmitted as an airborne radio signal or along a separate pilot wire or otherwise as long as the intelligence reaches the relaying device 4B. In this particular application, the presence of the signal transmitted from the remote terminal 8B is necessary for the improved operation as will be evident from the description below. The output signal of the transmitter 24 is prevented from entering the line portions or sections 1A and 1B by the filter networks 28A and 28B which networks readily pass the low frequency (for example 60 cycles per second) power through the network 1 but substantially completely block the flow of the higher frequency output of the transmitter 24. Normally the transmitter keying circuit 22 is held in a condition to prevent the transmitter 24 from transmitting an output signal until operation of the relay 16.

The relaying devices 4A and 4B are each provided with a receiver such as the receiver 30 of the device 4A. The receiver 30 is tuned to receive the output signal from the transmitter of the relaying device 4B which corresponds to the transmitter 24 and vice versa. The transmitters 24 of the relaying devices 4A and 4B are tuned to different frequencies and are paired with the receiver 30 such that the receiver 30 will receive solely the signal transmitted by the transmitter 24 of the opposite relaying device. This arrangement, which is not required in the disclosure of the Altfather patent, is required here for reasons which will be made clear below. In each device 4A and 4B, the output of the included receiver 30 is applied to its remote squaring amplifier 32 which squares the received signal.

The output signals of the local and remote squaring amplifiers 14 and 32 are each supplied to the AND networks 34 and 35. The AND network 34 is illustrated more completely in the said Altfather patent and is similar to the AND network 35 illustrated herein in FIG. 2. The AND network 35 comprises a pair of input terminals 35A and 35B and a single output terminal 161A; each of the input terminals 35A and 35B being individually connected through diodes to the output terminal 161A.

The output of the local squaring amplifier 14 and remote squaring amplifier 32 are connected directly to the AND circuit 34 in the manner shown in said Altfather patent. These same squaring amplifiers are connected to the AND network 35 through phase shifting networks 37 and 37A which are adjusted to reverse the phase of the input signal which is applied between the pairs of the input terminals 80–82 and 80–144 of the phase shifting networks 37 and 37A.

The phase shifting network 37 comprises a transistor 92A which has its emitter connected directly to a positive D.C. potential terminal 78 and its collector connected through a resistor to a negative D.C. potential terminal 80. A voltage dividing network, comprising three series connected resistors is connected between the negative D.C. terminal 80 and a positive D.C. terminal 76. The potential of the terminal 76 is maintained slightly in excess of the potential of the positive D.C. terminal 78. The common connection 96A of the center resistor and the resistor closest to the termnial 76 connects with the base of the transistor 92A and the common terminal 96B between the center resistor and the resistor closest to the negative D.C. terminal 80 is connected to the control terminal 82. The network 37A is similarly constructed and is provided with a control terminal 144 which corresponds to the control terminal 82 of the network 37.

As will be explained in greater detail below, the networks 34, 35, and 36 serve to pass an effective signal to the delaying networks 38 and 40 when the phase angle between the output signals of the amplifiers 14 and 32 is below a predetermined magnitude and to prevent such a passage and consequent timing other than the delay networks when the phase angle is greater than this predetermined magnitude. The delay network 38 which may be set for example for a 4 millisecond delay is connected to actuate a flip-flop or switch 42 which controls one input of an AND amplifier 44. The other input of amplifier 44 is controlled by the relay 18 which prevents the flip-flop 42 from tripping the trip relay 50 and thereby the breaker 2A unless the relay 18 has operated.

The output of the delaying network 40 is supplied to a desensitizing network 46 through a delaying network 48. As is explained in greater detail in the Altfather patent, this desensitizing network 46 normally maintains the flip-flop 42 ineffective to switch and provide a signal for operation of the AND amplifier 44 during periods when the network 1 is not faulted. In the event of a fault of sufficient magnitude to operate the relay 18, the desensitizing network 46 is actuated to sensitize the flip-flop 42 to respond to the output signal, if any, of the delay network 38. If the fault is internal to the section 1C, the phase of the signal supplied by the amplifiers 14 and 32 is not greater than the predetermined critical angle and after the delay of about 4 milliseconds a signal indicative of an internal fault (one within the protected line section 1C) is supplied to the AND amplifier 44.

If the fault which caused operation of the relay 18 is external to the line section 1C, the delay network will not time out. In this event, it is desired that the desensitizing network 46 be returned to its initial position for desensitizing the flip-flop network 42 so that it will now respond to spurious or transient signals which might be transmitted through the delay network 38. In order that the relay apparatus 4A may respond to an internal fault which may subsequently occur, the delay network 48 is connected to be reset to its non-timed-out or initial condition by the timing out of the delay network 40. This resetting actuates the desensitizing network 46 to sensitize the flip-flop network 42. Since the delay network 40 can time out only because of the actuation of the phase AND network 36, and the phase AND network 36 can only be actuated for this purpose in the event of the occurrence of a local fault within the protected line section 1C, the flip-flop 42 will be resensitized only if a local fault occurs and will not be resensitized by the external fault.

The trip relay 50 is connected to control the operation of the breaker trip coil 52 which when energized will open the contacts of the breaker 2A to disconnect the section 1C from the power section 1A.

The low pass filter 10 may take any desired form and is arranged to provide a frequency of the power being transmitted by the line section 1C so that the output of the phase shift circuit corresponds to that of the power in the network 1.

The AND circuits 34, 35, and 36 are of the type in which the concurrent presence of an actuating signal at both inputs is necessary in order to provide a control signal at its output terminal. As will be apparent from FIG. 10 of the said Altfather patent, this occurs when a negative potential is applied to each of the input terminals whereby the capacitor 148 of the delay network 38 may charge. When so charged, the potential of its output terminal 157 is reduced sufficiently below the potential of the regulated output of the positive potential regulated output terminal 78 so that the transistor 166 of the flip-flop network 42 may conduct. The period during which the predetermined control signal is supplied, is represented by the cross-hatched section of the curves of FIGS. 3 and 4. If the direction of power flow at one location is into the protected network 1C and at the other location is out of the network and the magnitude of the power is of a fault magnitude, the output of the local squaring amplifier 14 will be represented by the curve 300 and the output of the remote squaring amplifier is represented by the curve 302. It will be evident from an examination of FIG. 3, that at no time are both of the input terminals to the AND circuit 34 concurrently energized with a control signal. Under this condition, the output of the AND circuit 34 retains the terminal 161 sufficiently positive so that the delay network capacitor 148 cannot charge and the transistor 166 of the flip-flop 42 remains non-conductive.

The phase shifting networks 37 and 37A of FIG. 2 shift the phase of the signal applied to the AND network 35 whereby the signal applied by the terminal 82A of the AND circuit 35 which is represented by the curve 304 which is phase shifted 180° from the curve 300 and the signal supplied by the phase shifting network 37A to the terminal 144A is represented by the curve 306.

It will be noted that the curves 304 and 306 are each phase displaced 180° from the curves 300 and 302 and are also arranged such that at no time is a control signal concurrently applied to both of the input terminals 35A and 35B of the AND circuit 35. These curves 300, 302, 304 and 306 represent the signals which occur in the event of an external fault when it is not desired to provide an output to actuate the flip-flop network 42 to energize the trip coil 52.

The case of an internal fault is illustrated in FIG. 4. When an internal fault occurs, the power at each of the terminals 8A and 8B will follow into the line section 1C and the phase of the signal derived from the remote section will be reversed from that shown in FIG. 3. The output signal 302A of the remote squaring amplifier is now in phase with the signal 300A from the local squaring amplifier as is shown in FIG. 4, and the AND circuit 34 is energized to provide its output signal during the entire interval that its two input circuits are concurrently energized. The phase shifters 37 and 37A phase shift the outputs of the local and remote squaring amplifiers to provide input signals 304A and 306A for the AND circuit 35. It will be noted that these control signals 304A and 306A are also in phase and are phase displaced 180° from the input signals 300A and 302A. With this arrangement one or the other of the AND circuits 34 and 35 will supply an output signal to the delay network 38 immediately upon the occurrence of an internal fault. Therefore within the desired time interval as determined by the delay network 38, the AND amplifier 44 will be energized to actuate the trip coil 52 for opening the breaker contacts 2A.

As illustrated, the desensitizer network 46 is actuated by the output signal of the AND network 36 through a signal delay network 40 and 48. Under normal operating conditions, the time delay caused by the operation of the phase AND circuit 36 solely at one half-cycle of the voltage wave in the line section 1C is not excessive. It will be apparent, however, that if desired an additional phase AND circuit corresponding to the network 36 and energized from the output of the phase shifters 37 and 37A may be provided. This will decrease the delay necessary to resensitize the desensitizer 46.

While there is shown in FIGS. 3 and 4 an on-off type energization of the AND circuits 34, 35 and 36, such an energization may readily take the form of an alternating square wave or other potential wave shape and while the phase shift imparted by the phase shifters 37 and 37A is shown as being 180°, such a shift, could be of a different angle and additional phase shifters corresponding thereto could be placed in the input to the AND circuit 34. If it is not desired to energize the delay network 38 at all points in the 360° wave of the voltage of the network 1C, a lesser amount of phase shift than 180° between the sets of signals also could be provided.

Since numerous changes may be made in the above described apparatus and different embodiments of the invention may be made without departing from the spirit thereof, it is intended that all the matter contained in the foregoing description or shown in the accompanying drawings, shall be interpreted as illustrative and not in a limiting sense.

What is claimed and is desired to be secured by United States Letters Patent is as follows:

1. In a relaying apparatus, first and second energizable networks, each said netwok having an input connection and an output connection and means establishing a repeating output signal at its said output connection which repeats in fixed phase relationship with respect to a pulsating control applied to its said input connection, said signal comprising alternately occurring portions, first and second actuated networks, each said actuated network having first and second input connections and an output connection and effective to provide a desired output signal solely when its said first and second input connections are concurrently energized with first predetermined alternate ones of said signal portions and second predetermined alternate ones of said signal portions, first circuit means connecting said output connections of said first and second networks to said first and second input connections of said first actuated network for energization by said signals of said energizable networks, second circuit means connecting said output connections of said first and second networks to said first and second input connections of said second actuated network for energization by said signals of said energizable networks, at least one of said circuit means including phase shifting means for shifting the phase of said signal portions which are applied thereby to the said input connections to which it is connected with respect to the phase of said output signals which are applied thereto from said energizable networks, and a load device connected to said output connections of said actuated networks and actuatable by either of said desired output signals.

2. The combination of claim 1 in which the time period of said signal portions are all of equal durations, said predetermined one signal portion and said predetermined second signal portion are both the same portion of said first signal, and the phase of said predetermined signal portions supplied to one of said actuated networks is shifted substantially 180° from the phase of said predetermined signal portions supplied to the other of said actuated networks.

3. The combination of claim 1 with an electrical transmission line connected to transmit power between first and second locations, means operatively connecting said input connections of said energizable networks to said line at said first and second locations, said energizable networks being operable to phase shift its said output signal in accordance with the phase of the power flow at the said location to which it is operatively connected, said phasing of said networks and circuits being such that when the flow of said power at each of said locations is into said line said first portion and second predetermined signal portions occur concurrently at said first actuated network and concurrently at said second actuated network.

4. The combination of claim 3 in which the time period of said signal portions are all of equal duration said predetermined one signal portion and said predetermined second signal portion are both the same portion of said first signal, and the phase of said predetermined signal portions supplied to one of said actuated networks is shifted substantially 180° from the phase of said predetermined signal portions supplied to the other of said actuated networks.

5. In a protective relaying apparatus, first and second actuated networks, said first and second networks being operable to deliver first and second control signals respectively, each said signal comprising first and second signal portions occurring in alternate sequence, each said AND network having a pair of input connections and an output connection rendered in a first condition solely when said first signal portion is supplied to both of its said input connections, a pair of AND networks, a pair of phasing networks operable to time shift said control signal, a first connecting means connecting a first of said actuated networks to one of said input connections of a first of said AND networks for supplying said first control signal thereto, second connecting means including a first of said phasing networks connecting said first actuated network to one of said input connections of a second of said AND networks for supplying said first control signal thereto in a time displaced phase with respect to that delivered by said first actuated network, a third connecting means connecting a second of said actuated networks to the other of said input connections of said first AND network for supplying said second control signal thereto, a fourth connecting means including a second of said phasing networks connecting said second actuated network to the other of said input connections of said second AND network for supplying said second control signal thereto in a time displaced phase with respect to that delivered by said second actuated network, an actuated device, and a fifth connecting means connecting said output connections of said AND networks to said actuated device for actuation of said actuated device by either of said AND networks.

6. The combination of claim 5 in which a time delay device is connected into said fifth connecting means to delay the actuation of said actuated device by said AND networks.

7. The combination of claim 6 in which the time durations of said first and second signal portions are substantially equal and the time delay of said delay means is less than the time durations of said signal portions.

8. The combination of claim 7 in which the time delay of said delay means is a minor fraction of the time duration of said delay means.

9. The combination of claim 7 with an alternating potential electrical power transmission line having a section to be protected extending between first and second locations, a first sensitive network having input terminals effectively connected to said line at said first location and energized as a function of the direction of flow of power at said first location and having a first alternating potential output quantity with a phase determined by the direction of power flow at said first location, a second sensitive network having input terminals effectively connected to said line at said second location and actuated as a function of the direction of the flow of power at said second location and having a second alternating potential output quantity with a phase determined by the direction of power flow at said second location, means connecting said first and second sensitive networks to said first and second actuated networks respectively whereby a characteristic of each of said first and second control signals is determined by the direction of power flow at said first and second location respectively.

10. The combination of claim 9 in which one of said sensitive networks is responsive to the magnitude of the power flow at the location to which it is connected, said one sensitive network being ineffective to supply its said alternating output quantity when the magnitude of power flow at the location to which said one sensitive network is connected is below a critical magnitude.

References Cited

UNITED STATES PATENTS

| | | | |
|---|---|---|---|
| 3,176,190 | 3/1965 | Hodges | 317—28 |
| 3,214,639 | 10/1965 | Cabanes et al. | 317—26 X |
| 3,311,785 | 3/1967 | Lensner | 317—28 |
| 3,381,178 | 4/1968 | Rockefeller | 317—28 X |

LEE T. HIX, Primary Examiner

J. D. TRAMMELL, Assistant Examiner

U.S. Cl. X.R.

317—28, 39